(12) United States Patent
Downey

(10) Patent No.: US 8,113,495 B2
(45) Date of Patent: Feb. 14, 2012

(54) VIBRATION DAMPER

(76) Inventor: Paul C. Downey, Toronto (CA)

( * ) Notice: Subject to any disclaimer, the term of this patent is extended or adjusted under 35 U.S.C. 154(b) by 0 days.

(21) Appl. No.: 12/325,960

(22) Filed: Dec. 1, 2008

(65) Prior Publication Data

US 2009/0072457 A1    Mar. 19, 2009

Related U.S. Application Data

(63) Continuation of application No. 11/120,062, filed on May 2, 2005, now abandoned.

(51) Int. Cl.
*F16M 9/00* (2006.01)
*F16F 7/12* (2006.01)
*F16F 3/12* (2006.01)

(52) U.S. Cl. .................. 267/140.4; 267/141.1; 267/143; 267/145; 267/152; 267/153; 248/633

(58) Field of Classification Search ............... 267/140.3, 267/140.4, 141, 141.1, 142–145, 153, 151, 267/152; 52/403.1, 480; 428/158, 159, 164; 248/632, 633, 634
See application file for complete search history.

(56) References Cited

U.S. PATENT DOCUMENTS

| 205,271 | A | 6/1878 | Hyatt |
|---|---|---|---|
| 1,554,179 | A | 9/1925 | Trader |
| 1,940,105 | A | 12/1933 | Schmid |
| 2,001,916 | A | 5/1935 | Mazer |
| 2,077,617 | A | 4/1937 | Cramer |
| 2,270,902 | A | 1/1942 | Rubissow |
| 2,288,054 | A | 6/1942 | Walton |
| 2,290,622 | A | 7/1942 | Carter |
| 2,337,525 | A | 12/1943 | Peik |
| 2,665,848 | A | 1/1954 | Smith et al. |
| 2,768,091 | A | 10/1956 | Cubberley |
| 2,821,254 | A | 1/1958 | Kernen |
| 2,862,255 | A | 12/1958 | Nelson |
| 2,940,887 | A | 6/1960 | Daly et al. |
| 2,961,029 | A | 11/1960 | Rainar |
| 3,026,224 | A | 3/1962 | Rogers, Jr. |
| 3,160,549 | A | 12/1964 | Caldwell et al. |
| 3,311,331 | A | 3/1967 | Steimen |
| 3,345,245 | A | 10/1967 | Hanusa |
| 3,399,103 | A | 8/1968 | Salyer et al. |
| 3,418,812 | A | 12/1968 | Khan et al. |

(Continued)

FOREIGN PATENT DOCUMENTS

DE         41 41 023 A1    6/1993

(Continued)

OTHER PUBLICATIONS

Regupol 6010BA Information Sheet, 2 pgs.

(Continued)

*Primary Examiner* — Thomas J Williams
(74) *Attorney, Agent, or Firm* — Tarolli, Sundheim, Covell & Tummino LLP

(57) ABSTRACT

A vibration damper comprises a vibration dampening structure and a load bearing plate disposed on the vibration dampening structure. The vibration dampening structure includes a slip resistant layer and at least one foam layer disposed between the slip resistant layer and the load bearing plate. A resilient mounting layer is disposed on the load bearing plate. The vibration damper may act directly between an underlying support surface and equipment or may act between the underlying support surface and a sheet of flooring.

19 Claims, 4 Drawing Sheets

U.S. PATENT DOCUMENTS

| | | | |
|---|---|---|---|
| 3,567,563 A | | 3/1971 | Haudenchild et al. |
| 3,579,941 A | | 5/1971 | Tibbals |
| 3,641,855 A | | 2/1972 | Balle |
| 3,770,560 A | | 11/1973 | Elder et al. |
| 3,893,619 A | | 7/1975 | Bruner |
| 3,917,501 A | | 11/1975 | Ferrucci et al. |
| 3,924,907 A | | 12/1975 | Czernik et al. |
| 3,948,009 A | | 4/1976 | Bernhard |
| 3,985,198 A | | 10/1976 | Kurtze et al. |
| 4,002,315 A | | 1/1977 | Van Goubergen |
| 4,060,502 A | | 11/1977 | Benton |
| 4,112,176 A | | 9/1978 | Bailey |
| 4,143,495 A | | 3/1979 | Hintz |
| 4,179,067 A | | 12/1979 | Baier |
| 4,190,131 A | | 2/1980 | Robinson |
| 4,242,391 A | * | 12/1980 | Reinhardt et al. ............... 428/76 |
| 4,244,841 A | | 1/1981 | Frankland |
| 4,265,398 A | | 5/1981 | Luebke |
| 4,428,454 A | | 1/1984 | Capaul et al. |
| 4,457,120 A | | 7/1984 | Takata |
| 4,500,037 A | | 2/1985 | Braitsch et al. |
| 4,551,362 A | | 11/1985 | Harms et al. |
| 4,566,231 A | | 1/1986 | Konsevich |
| 4,637,942 A | | 1/1987 | Tomarin |
| 4,672,100 A | | 6/1987 | Schonbachler et al. |
| 4,681,786 A | | 7/1987 | Brown |
| 4,685,259 A | | 8/1987 | Eberhart et al. |
| 4,694,627 A | | 9/1987 | Omholt |
| 4,696,429 A | | 9/1987 | Ortwein |
| 4,720,043 A | | 1/1988 | Ortwein |
| 4,753,841 A | | 6/1988 | Noel et al. |
| 4,755,408 A | | 7/1988 | Noel |
| 4,771,944 A | | 9/1988 | Brister et al. |
| 4,803,112 A | | 2/1989 | Kakimoto et al. |
| 4,851,500 A | | 7/1989 | Lalwani et al. |
| 4,860,506 A | | 8/1989 | Yoshimi et al. |
| 4,888,927 A | | 12/1989 | Yoshimi et al. |
| 4,910,935 A | | 3/1990 | Leukel et al. |
| 4,917,932 A | | 4/1990 | McClung |
| 4,945,697 A | | 8/1990 | Ott et al. |
| 4,957,798 A | | 9/1990 | Bogdany |
| 4,967,529 A | | 11/1990 | L'Heureux |
| 5,016,413 A | | 5/1991 | Counihan |
| 5,060,856 A | | 10/1991 | Ortwein |
| 5,096,772 A | | 3/1992 | Snyder |
| 5,110,660 A | | 5/1992 | Wolf et al. |
| 5,183,438 A | * | 2/1993 | Blom ............................... 428/17 |
| 5,187,905 A | | 2/1993 | Pourtau et al. |
| 5,258,222 A | | 11/1993 | Crivelli |
| 5,383,314 A | | 1/1995 | Rothberg |
| 5,424,099 A | | 6/1995 | Stewart et al. |
| 5,438,171 A | | 8/1995 | Schmanski |
| 5,439,735 A | | 8/1995 | Jamison |
| 5,472,750 A | | 12/1995 | Miller |
| 5,482,754 A | | 1/1996 | Crook |
| 5,487,501 A | | 1/1996 | Engst et al. |
| 5,527,409 A | | 6/1996 | Lanphier |
| 5,572,842 A | | 11/1996 | Stief et al. |
| 5,584,950 A | | 12/1996 | Gaffigan |
| 5,619,832 A | | 4/1997 | Myrvold |
| 5,653,099 A | | 8/1997 | MacKenzie |
| 5,714,219 A | | 2/1998 | Mashunkashey et al. |
| 5,721,035 A | | 2/1998 | Dunn |
| 5,738,279 A | | 4/1998 | Ihle et al. |
| 5,744,763 A | | 4/1998 | Iwasa et al. |
| 5,766,721 A | | 6/1998 | Bussey, Jr. et al. |
| 5,851,338 A | | 12/1998 | Pushaw |
| 5,867,957 A | | 2/1999 | Holtrop |
| 5,873,936 A | | 2/1999 | Ogden |
| 5,879,781 A | | 3/1999 | Mehta et al. |
| 5,956,921 A | | 9/1999 | Fleck et al. |
| 6,077,613 A | | 6/2000 | Gaffigan |
| 6,182,413 B1 | | 2/2001 | Magnusson |
| 6,212,838 B1 | | 4/2001 | Eda |
| 6,213,252 B1 | | 4/2001 | Ducharme |
| 6,224,707 B1 | | 5/2001 | Lion |
| 6,235,367 B1 | | 5/2001 | Holmes et al. |
| 6,251,493 B1 | | 6/2001 | Johnson et al. |
| 6,256,955 B1 | | 7/2001 | Lolley et al. |
| 6,291,048 B1 | | 9/2001 | Jerdee et al. |
| 6,372,069 B1 | | 4/2002 | Walls |
| 6,386,461 B1 | | 5/2002 | Wildgoose |
| 6,427,925 B1 | | 8/2002 | Gaudet |
| 6,468,631 B1 | | 10/2002 | Pahl et al. |
| 6,481,637 B1 | | 11/2002 | McQueen |
| 6,541,105 B1 | | 4/2003 | Park |
| 6,595,321 B1 | | 7/2003 | Tompson |
| 6,602,586 B2 | | 8/2003 | Kakimoto et al. |
| 6,708,896 B2 | | 3/2004 | Robinson |
| 6,723,413 B2 | | 4/2004 | Walters |
| 6,769,834 B1 | | 8/2004 | Stange |
| 6,796,096 B1 | | 9/2004 | Heath |
| 6,920,723 B2 | | 7/2005 | Downey |
| 6,945,007 B2 | | 9/2005 | Kobayashi et al. |
| 6,990,703 B2 | | 1/2006 | Brown et al. |
| 7,055,649 B2 | | 6/2006 | Tompson et al. |
| 7,080,712 B2 | | 7/2006 | Tsuiki et al. |
| 7,096,630 B2 | | 8/2006 | Keene et al. |
| 7,166,678 B2 | | 1/2007 | Dunlap et al. |
| 7,182,994 B1 | | 2/2007 | Scott |
| 7,263,028 B2 | | 8/2007 | Thomas et al. |
| 7,265,178 B2 | | 9/2007 | Maier et al. |
| 7,278,588 B2 | | 10/2007 | English et al. |
| 7,331,534 B2 | | 2/2008 | McQueen |
| 7,464,791 B2 | | 12/2008 | Cooksey et al. |
| 7,566,374 B2 | | 7/2009 | Brazier et al. |
| 7,730,684 B1 | | 6/2010 | Keene |
| 7,730,685 B1 | | 6/2010 | Keene |
| RE41,945 E | | 11/2010 | Downey |
| 2001/0052550 A1 | | 12/2001 | Janssens |
| 2002/0005250 A1 | | 1/2002 | Jerdee et al. |
| 2002/0040079 A1 | | 4/2002 | Lee et al. |
| 2002/0088193 A1 | | 7/2002 | Reimers et al. |
| 2002/0119716 A1 | | 8/2002 | Santhosh |
| 2003/0040405 A1 | | 2/2003 | Watterson et al. |
| 2003/0102184 A1 | | 6/2003 | Brisson et al. |
| 2004/0050482 A1 | | 3/2004 | Abrams |
| 2004/0096645 A1 | | 5/2004 | Hancy et al. |
| 2004/0123555 A1 | | 7/2004 | Cole |
| 2004/0127614 A1 | | 7/2004 | Jiang et al. |
| 2004/0202854 A1 | | 10/2004 | Esparza |
| 2005/0031829 A1 | | 2/2005 | Crenshaw et al. |
| 2005/0032447 A1 | | 2/2005 | Tachibana et al. |
| 2005/0037174 A1 | | 2/2005 | Streeton et al. |
| 2005/0126848 A1 | | 6/2005 | Siavoshai et al. |
| 2005/0282465 A1 | | 12/2005 | McNab |
| 2006/0008612 A1 | | 1/2006 | Brazier et al. |
| 2006/0016635 A1 | | 1/2006 | Downey |
| 2006/0024453 A1 | | 2/2006 | Setser et al. |
| 2006/0037815 A1 | | 2/2006 | Schabel, Jr. |
| 2006/0105136 A1 | | 5/2006 | Brazier et al. |
| 2006/0156663 A1 | | 7/2006 | Mao |
| 2006/0165950 A1 | | 7/2006 | Dodge, III |
| 2006/0167206 A1 | | 7/2006 | Maier et al. |
| 2006/0189750 A1 | | 8/2006 | Maier et al. |
| 2006/0191743 A1 | | 8/2006 | Pike, Sr. et al. |
| 2006/0205869 A1 | | 9/2006 | Steidl et al. |
| 2006/0230699 A1 | | 10/2006 | Keene |
| 2007/0004306 A1 | | 1/2007 | Leeser et al. |
| 2007/0172629 A1 | | 7/2007 | Dodge |
| 2007/0261365 A1 | | 11/2007 | Keene |
| 2008/0010930 A1 | | 1/2008 | Mao |
| 2009/0283658 A1 | | 11/2009 | Keene |
| 2010/0229486 A1 | | 9/2010 | Keene |
| 2011/0107700 A1 | | 5/2011 | Keene |

FOREIGN PATENT DOCUMENTS

| | | |
|---|---|---|
| DE | 199 32 991 A1 | 6/2000 |
| EP | 0 916 629 A1 | 5/1999 |
| EP | 0 982 444 A1 | 3/2000 |
| EP | 1 447 495 A1 | 8/2004 |
| EP | 1 739 253 A2 | 1/2007 |
| EP | 1 757 75081 | 4/2010 |
| FR | 2 824 094 A1 | 10/2002 |
| GB | 841 867 A | 7/1960 |
| GB | 1 120 827 A | 7/1968 |
| GB | 2 379 934 A | 3/2003 |

| | | | |
|---|---|---|---|
| GB | 2 437 180 A | 10/2007 |
| JP | 48014737 A * | 1/1974 |
| JP | 8-297492 A | 11/1996 |
| WO | WO-83/02127 A1 | 6/1983 |
| WO | WO-87/00828 A1 | 2/1987 |
| WO | WO-93/12283 A1 | 6/1993 |
| WO | WO-99/66144 A1 | 12/1999 |
| WO | WO-01/55530 A1 | 8/2001 |
| WO | WO-02/35025 A1 | 5/2002 |
| WO | WO-02/094550 A1 | 11/2002 |
| WO | WO-2004/031501 A1 | 4/2004 |
| WO | WO-2004/058416 A1 | 7/2004 |
| WO | WO-2006/131138 A1 | 12/2006 |
| WO | WO-2007/015081 A1 | 2/2007 |
| WO | WO-2007/082339 A1 | 7/2007 |

OTHER PUBLICATIONS

Vibration Insulation Brochure, 28 pgs.

* cited by examiner

VIBRATION DAMPER

RELATED APPLICATION

This application is a continuation of U.S. patent application Ser. No. 11/120,062, filed May 2, 2005 now abandoned. The subject matter of the aforementioned application is incorporated herein by reference.

FIELD OF THE INVENTION

The present invention relates generally to noise and vibration absorption and more particularly, to vibration damper for mitigating noise and vibration.

BACKGROUND OF THE INVENTION

Unwanted noise and vibration is common in many environments. Although such noise and vibration can be tolerated in some cases, in many situations it cannot thus requiring structures and/or equipment to be isolated from the sources of noise and vibration. For example, in many circumstances, noise is generated on horizontal surfaces such as floors due to various, impacts. This noise often propagates into surrounding structures creating undesirable noise and vibration pollution. In commercial environments, large commercial and industrial machinery and equipment, which vibrates during use, often results in impact and/or vibrational noise passing through the floor and into adjacent structures. In residential environments, exercise equipment such as treadmills, Jacuzzi tubs, whirlpool baths and hot tubs, which vibrate during use, result in impact and/or vibrational noise passing into adjacent structures. In environments where sensitive measurement or high-tolerance equipment such as MRI devices and CNC machines is operating, it is necessary to isolate such equipment from vibration to ensure accurate and proper operation.

Techniques to dampen noise and vibration have of course been considered, and many different types of vibration mitigating mats and pads to absorb vibration exist. For example, U.S. Pat. No. 6,796,096 to Heath discloses an impact absorbing surface covering for high traffic areas. The impact absorbing surface covering includes a shock pad of recycled closed cell foam and an impervious wear surface thereon.

U.S. Pat. No. 4,002,315 to Van Goubergen discloses a vibration damper in the form of a stackable mat formed of dampening material. Projections are provided on the upper and lower surfaces of the mat.

Also, floating floors to accommodate vibration and/or structure shifts and settling exist. Unfortunately, to-date these solutions to deal with unwanted noise and vibration have proven either to be inadequate, too expensive and/or too complicated. As will be appreciated, there exists a need for an effective, simple and inexpensive noise and vibration dampening device.

It is therefore an object of the present invention to provide a novel vibration damper.

SUMMARY OF THE INVENTION

Accordingly, in one aspect there is provided a vibration damper comprising a vibration dampening structure and a load bearing plate disposed on the vibration dampening structure.

In one embodiment, the load bearing plate is a steel plate adhered to the vibration dampening structure. The vibration dampening structure includes a layer of slip resistant material and at least one layer of foam material disposed between the slip resistant layer and the load bearing plate. The layer of slip resistant material is formed of recycled bound rubber product and has a contoured bottom surface. The contoured bottom surface has variations in thickness and comprises an array of peaks and valleys giving the bottom surface an "egg-crate" appearance.

The at least one layer of foam material may include two or more layers of foam material, with each layer of foam material having a different density. The density characteristics of the foam layers are chosen depending on the nature of the load to be supported by the vibration damper. As loads increase, more dense foam material is used.

According to another aspect there is provided a vibration damper comprising a slip resistant layer having a contoured bottom surface, at least one layer of foam material disposed on a surface of the slip resistant layer opposite the bottom surface, and a load bearing plate disposed on the foam layer.

According to yet another aspect there is provided a floating floor comprising a generally planar sheet of flooring, and a plurality of vibration dampers acting between the sheet of flooring and an underlying floor surface at spaced locations. At least of the vibration dampers comprises a vibration dampening structure and a load bearing plate on the vibration dampening structure. The vibration dampening structure has a bottom surface to contact the floor surface.

In one embodiment, each vibration damper comprises a vibration dampening structure and a load bearing plate. The vibration dampening structure comprises a non-slip layer defining the bottom surface and at least one foam layer acting between the non-slip layer and the load bearing plate.

According to still yet another aspect there is provided a floating floor section comprising a generally planar sheet of flooring, and a plurality of vibration dampers secured to the sheet of flooring at spaced locations. Each vibration damper comprising a vibration dampening structure and a load bearing plate, thereon. The vibration dampening structure defines a bottom surface to contact an underlying floor surface on which the floating floor section is to be mounted. The load bearing plate is positioned adjacent the sheet of flooring.

The vibration damper effectively absorbs noise and vibration, is inexpensive to manufacture and is easy to install and use. When used beneath vibrating equipment, the vibration damper virtually eliminates noise and vibration from propagating to surrounding structures. When used beneath sensitive measurement and high-tolerance equipment, the vibration damper effectively inhibits vibration generated in the surrounding environment from propagating to the equipment supported by the vibration damper.

BRIEF DESCRIPTION OF THE DRAWINGS

Embodiments will now be described more fully with reference to the accompanying drawings in which.

DETAILED DESCRIPTION OF THE EMBODIMENTS

Figure 1:
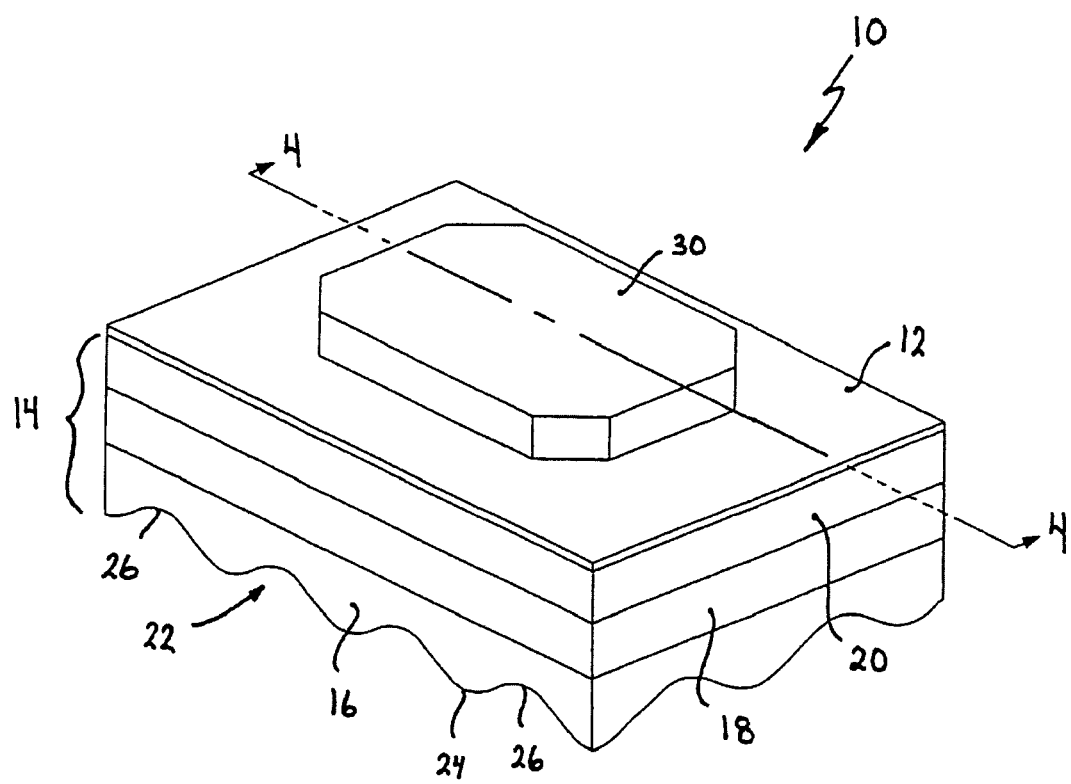
FIG. 1 is a perspective view taken from above and from the side of a vibration damper.
Figure 2:
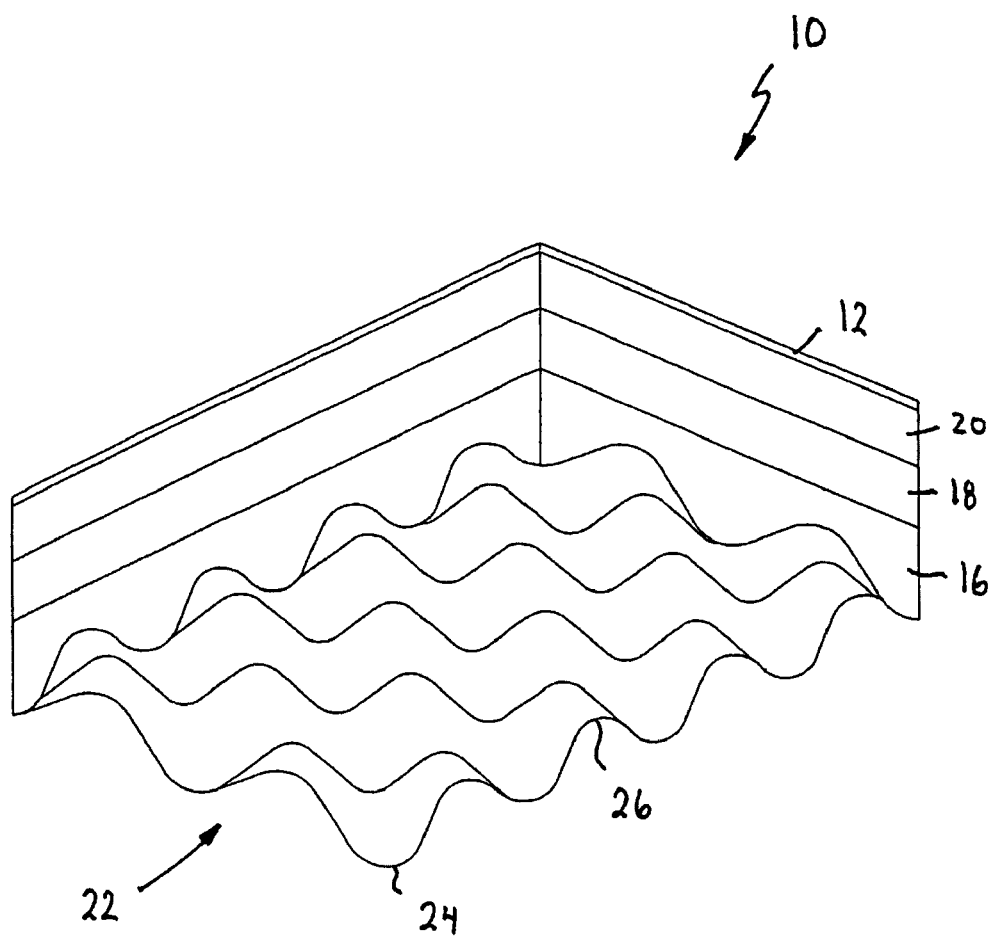
FIG. 2 is a perspective view taken from below and from the side of the vibration damper.
Figure 3:
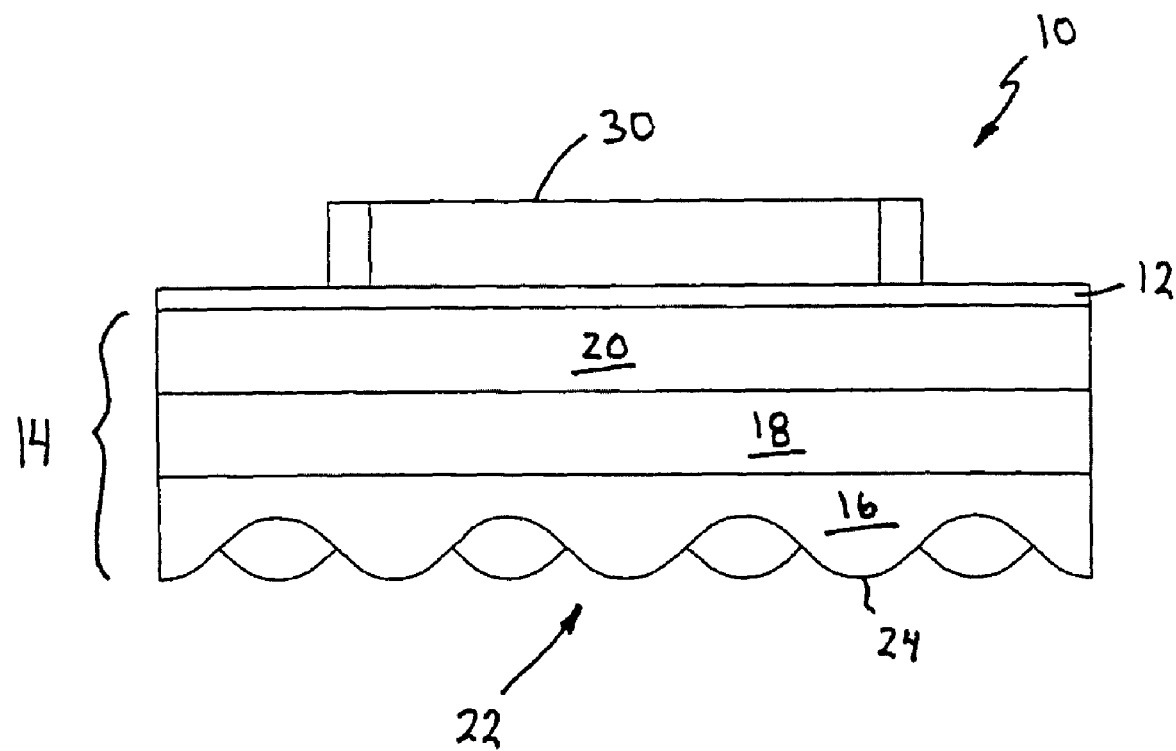
FIG. 3 is a side elevational view of the vibration damper.
Figure 4:
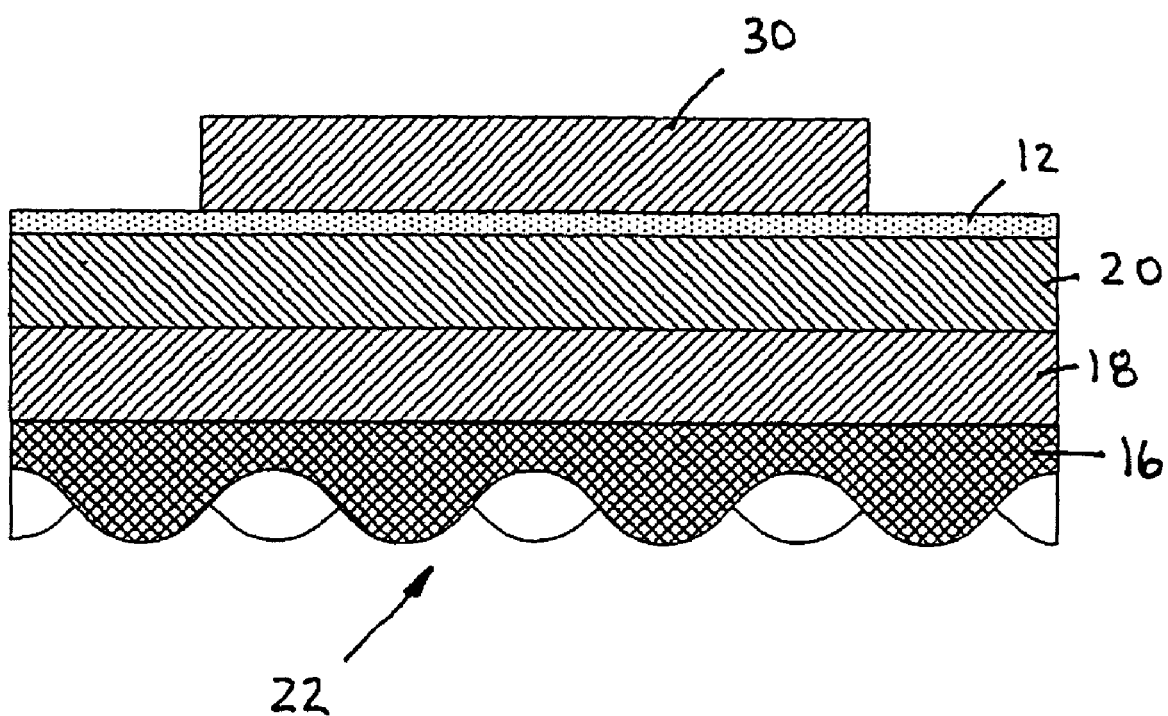
FIG. 4 is a cross-sectional view of the vibration damper taken along line 4-4 in FIG. 1.

Turning now to FIGS. 1 to 4, a vibration damper is shown and is generally identified by reference numeral 10. Vibration damper 10 is designed to act between a support surface such as an underlying floor surface and residential or commercial equipment. Depending on the nature of the equipment to be supported, vibration damper 10 acts to inhibit impact and vibrational noise generated by the equipment from propagating to surrounding structures and/or to inhibit vibration in the surrounding environment from propagating to the equipment.

As can be seen, vibration damper 10 includes a load bearing plate 12 disposed on a vibration dampening structure 14. The vibration dampening structure 14 in this example includes a slip resistant lower layer 16 and a pair of intermediate foam layers 18 and 20 disposed between the lower layer 16 and the load bearing plate 12.

The bottom surface 22 of the lower layer 16 is contoured to define peaks 24 and valleys 26 that are sequentially alternated in a three-dimensional array giving the bottom surface 22 an "egg-crate" appearance. The depth and pitch of the peaks 24 and valleys 26 i.e. its geometry, is selected to give the vibration damper 10 a desired dynamic compression characteristic resulting in the vibration damper 10 undergoing a desired amount of compressive deflection under a given dynamic load. This dynamic compressive deflection characteristic serves to mitigate transfer of structure borne or impact noise. Sharp and long peaks 24 and valleys 26 offer greater dynamic compression or deflection under relatively small loads while wide and short peaks 24 and valleys 26 result in less dynamic compression or deflection under relatively larger loads. The contour of the bottom surface 22 also provides enhanced slip-resistance thereby to inhibit sliding of the vibration damper 10 relative to the support surface on which the vibration damper 10 rests.

The lower layer 16 is formed of recycled bound rubber product. During the manufacturing process, Styrenebutadiene Rubber (SBR) and natural rubber are mixed with polyurethane and cured under moderate temperature. Although the lower layer 16 typically has a large percentage of SBR rubber therein, the lower layer 16 can be made entirely of SBR rubber, other rubbers or a combination thereof.

Each intermediate foam layer 18, 20 is formed of polyetherurethane foam and has a different density. Typically the lower foam layer 18 is more dense than the upper foam layer 20. The densities of the foam layers are dependent on the environment in which the vibration damper 10 is being used. In cases where the vibration damper 10 is to be subjected to high loads, higher density foam layers are used. Generally, the density of the foam layers 18, 20 and the contour of the bottom surface 22 are selected so that for the intended environment, the vibration damper 10 provides the desired load deflection and vibration insulation while exhibiting the desired dynamic and static stiffness. Foam densities in the range from about 120 kg/m$^3$ to 1000 kg/m$^3$ have been found to be suitable for most applications.

The load bearing plate 12 is formed of steel and can be powder coated if desired. A small resilient mount pad 30 formed of polyetherurethane foam material is centrally disposed on the load bearing plate 12 to provide a non-slip mount surface for the equipment supported by the vibration damper 10.

The lower and intermediate layers 16 to 20 are assembled either through a lamination machine or through a machine that mechanically or chemically bonds the layers, together to form the vibration dampening structure 14. Once the vibration dampening structure 14 is complete, the load bearing plate 12 and mount pad 30 are adhered to or otherwise bonded to the vibration dampening structure 14 to complete the vibration damper 10.

In use, one or more vibration dampers 10 are placed between the equipment and support surface on which the equipment rests at appropriate locations i.e. under the feet and/or support surfaces of the equipment. The vibration dampers are typically not fixed or adhered to the support surface. The peaks 24, which contact the support surface, provide an effective non-slip surface even in wet conditions. The mount pads 30 on the load bearing plates 12 provide suitable mounts for the equipment. With the density of the foam layers 18, 20 properly selected in view of the particular environment, equipment vibration is effectively absorbed by the vibration dampers 10 inhibiting the vibration from propagating to surrounding structures. Also, vibration in the surrounding environment is absorbed by the vibration dampers 10 thereby to isolate equipment supported on the vibration dampers therefrom.

Although the vibration damper 10 is described as including a vibration dampening structure 14 with three layers 16, 18 and 20, other layer configurations can of course be used. For example, the vibration damper 10 can be constructed to include one or three or more intermediate foam layers. Of course other types of foam layers or layers of other suitable material can be used.

The vibration damper may be used in commercial and industrial applications as well as in residential applications. In commercial and industrial environments, the vibration damper 10 may be placed beneath machines and equipment such as HVAC compressors, fans, pumps and blowers that vibrate during use thereby to inhibit the transfer of machine and equipment vibration to surrounding structures. In residential environments, the vibration damper may be used between exercise equipment such as treadmills, Jacuzzi tubs, whirlpool baths, hot tubs etc. to inhibit the transfer of impact noise and/or vibration to surrounding structure. In noise sensitive environments, the vibration damper may be used between sensitive measurement and high-tolerance equipment such as for example MRI devices and CNC machines to isolate the sensitive measurement and high-tolerance equipment from vibration generated in the surrounding environment.

The vibration damper 10 can take basically any desired size. It has been found that 4" by 6" vibration dampers are suitable to support loads in the range of from about 50 lbs to 400 lbs, 5" by 7" vibration dampers are suitable to support loads in the range of from about 100 lbs to 1,000 lbs and 6" by 14" vibration dampers are suitable to support loads in the range of from about 100 lbs to 2500 lbs.

As will be appreciated by those of skill in the art, the vibration dampers need not directly support equipment. Rather, the vibration dampers can be used to support floor panels on which equipment is to rest. In this manner, the vibration dampers space the floor panels on which the equipment rests from the underlying structure floor creating a floating floor for the equipment. Pre-fabricated ready-to-install floating floor sections, each comprising a plurality of vibration dampers adhered or otherwise secured to a floor panel such as a plywood sheet at spaced locations can be constructed allowing larger floating floors incorporating the vibration dampers to be quickly and easily installed.

Although embodiments of the vibration damper have been described above with reference to the drawings, those of skill in the art will appreciate that variations and modifications may be made without departing from the spirit and scope thereof as defined by the appended claims.

What is claimed is:

1. A vibration damper configured to act between equipment that is subject to vibration and an underlying floor surface of a building structure, said vibration damper comprising:
   a plurality of compressible foam layers secured directly one on top of the other to form a stack, said stack of foam layers having substantially planar top and bottom surfaces and each foam layer having a different density;
   a non-compressible load bearing metal plate secured directly to the top surface of said stack of foam layers, said load bearing plate supporting equipment that is subject to vibration;
   a resilient mounting pad on said load bearing metal plate; and
   a rubber slip resistant layer secured directly to the bottom surface of said stack of foam layers, said slip resistant layer having a contoured bottom surface comprising an array of alternating peaks and valleys and overlying a portion of the floor surface on which the vibration damper is disposed, the contour of the bottom surface of said slip resistant layer surface and the relative densities of the foam layers of said stack being selected such that said vibration damper inhibits equipment vibrations from propagating to said floor surface.

2. A vibration damper according to claim 1 wherein said load bearing metal plate is formed of steel.

3. A vibration damper according to claim 1 wherein dimensions of said peaks and valleys are selected to give the vibration damper a desired dynamic compression characteristic under load.

4. A vibration damper according to claim 3 wherein said slip resistant layer is formed of Styrenebutadiene Rubber and natural rubber mixed with polyurethane.

5. A vibration damper according to claim 1 wherein said foam layers and slip resistant layer are one of mechanically bonded and chemically bonded.

6. A vibration damper according to claim 1 wherein said foam layers and slip resistant layer are laminated.

7. A vibration damper according to claim 1 wherein said load bearing metal plate is adhered the top surface of said stack of foam layers.

8. A vibration damper according to claim 1 wherein the density of each layer of foam material is in the range of 120 kg/m$^3$ to 1000 kg/m$^3$.

9. A vibration damper according to claim 1 wherein said slip resistant layer is formed of recycled rubber product.

10. A vibration damper according to claim 1 wherein said slip resistant layer is formed of Styrenebutadiene Rubber (SBR) and natural rubber mixed with a polyurethane.

11. A vibration damper configured to act between equipment that is subject to vibration and an underlying floor surface of a building structure, said vibration damper comprising:
   a rubber slip resistant layer having a contoured bottom surface comprising an array of alternating peaks and valleys, said contoured bottom surface overlying a portion of the floor surface on which the vibration damper is disposed;
   at least two compressible layers of foam material stacked directly one on top of the other to form a stack, each layer of foam material having a different density, the density of each layer of foam material being in the range of 120 kg/m$^3$ to 1000 kg/m$^3$, said stack of foam layers having substantially planar top and bottom surfaces and being directly disposed on a surface of said slip resistant layer opposite said bottom surface;
   a non-compressible load bearing plate disposed directly on said stack of foam layers and supporting the equipment that is subject to vibration, the contour of the bottom surface of said slip resistant layer and the relative densities of the foam layers of said vibration dampening structure being selected such that the vibration damper inhibits equipment vibrations from propagating to said floor surface; and
   a resilient mounting pad on said load bearing plate.

12. A vibration damper according to claim 11 wherein dimensions of said peaks and valleys are selected to give the vibration damper a desired dynamic compression characteristic under load.

13. A vibration damper according to claim 12 wherein the relative densities of the slip resistant layer and the foam layers of said vibration dampening structure are selected to provide said desired dynamic compression characteristic.

14. A vibration damper according to claim 13 wherein said slip resistant layer is formed of recycled rubber product.

15. A vibration damper according to claim 14 wherein said slip resistant layer is formed of Styrenebutadiene Rubber (SBR) and natural rubber mixed with a polyurethane.

16. A vibration damper according to claim 13 wherein said load bearing plate is formed of steel.

17. A vibration damper according to claim 11 wherein said foam layers and slip resistant layer are one of mechanically bonded and chemically bonded.

18. A vibration damper according to claim 11 wherein said foam layers and slip resistant layer are laminated.

19. A vibration damper according to claim 11 wherein said load bearing plate is adhered to said stack of foam layers.

* * * * *